United States Patent
West et al.

(10) Patent No.: US 9,396,024 B2
(45) Date of Patent: Jul. 19, 2016

(54) ONLINE COMPUTATION OF CACHE OCCUPANCY AND PERFORMANCE

(75) Inventors: Richard West, Easton, MA (US); Puneet Zaroo, Santa Clara, CA (US); Carl A. Waldspurger, Palo Alto, CA (US); Xiao Zhang, Rochester, NY (US); Haoqiang Zheng, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1355 days.

(21) Appl. No.: 12/251,108

(22) Filed: Oct. 14, 2008

(65) Prior Publication Data

US 2010/0095300 A1 Apr. 15, 2010

(51) Int. Cl.
| | | |
|---|---|---|
| G06F 9/46 | (2006.01) | |
| G06F 13/00 | (2006.01) | |
| G06F 13/28 | (2006.01) | |
| G06F 9/50 | (2006.01) | |
| G06F 12/08 | (2016.01) | |
| G06F 11/34 | (2006.01) | |

(52) U.S. Cl.
CPC *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5044* (2013.01); *G06F 9/5055* (2013.01); *G06F 11/3409* (2013.01); *G06F 11/3442* (2013.01); *G06F 11/3452* (2013.01); *G06F 12/08* (2013.01); *G06F 12/0802* (2013.01); *G06F 12/0804* (2013.01); *G06F 12/084* (2013.01); *G06F 12/0806* (2013.01); *G06F 12/0815* (2013.01); *G06F 11/3466* (2013.01); *G06F 2201/88* (2013.01)

(58) Field of Classification Search
USPC ................................. 711/130, 137
See application file for complete search history.

(56) References Cited

U.S. PATENT DOCUMENTS

| | | | |
|---|---|---|---|
| 6,282,613 B1 * | 8/2001 | Hsu et al. | 711/118 |
| 7,072,863 B1 * | 7/2006 | Phillips et al. | 705/36 R |
| 7,350,024 B2 * | 3/2008 | Chen et al. | 711/118 |
| 7,434,002 B1 * | 10/2008 | Zedlewski et al. | 711/130 |
| 2004/0111514 A1 * | 6/2004 | Chase | H04L 29/06 709/226 |
| 2008/0134185 A1 * | 6/2008 | Fedorova | 718/102 |
| 2009/0165004 A1 * | 6/2009 | Moses et al. | 718/102 |
| 2009/0172315 A1 * | 7/2009 | Iyer et al. | 711/158 |

OTHER PUBLICATIONS

Erik Berg et al., "Fast Data-Locality Profiling of Native Execution". SIGMETRICS '05, Jun. 6-10, 2005, Banff, Alberta, Canada (12 pages). Retrieved from the Internet: <URL: http://www.it.uu.se/research/group/uart/publications/berg_2005_jun>.

* cited by examiner

*Primary Examiner* — Charles Swift

(57) ABSTRACT

Methods, computer programs, and systems for managing thread performance in a computing environment based on cache occupancy are provided. In one embodiment, a computer implemented method assigns a thread performance counter to threads being created to measure the number of cache misses for the threads. The thread performance counter is deduced in one embodiment based on performance counters associated with each core in a processor. The method further calculates a self-thread value as the change in the thread performance counter of a given thread during a predetermined period, and an other-thread value as the sum of all the changes in the thread performance counters for all threads except for the given thread. Further, the method estimates a cache occupancy for the given thread based on a previous occupancy for the given thread, and the calculated shelf-thread and other-thread values. The estimated cache occupancy is used to assign computing environment resources to the given thread. In another embodiment, cache miss-rate curves are constructed for a thread to help analyze performance tradeoffs when changing cache allocations of the threads in the system.

23 Claims, 11 Drawing Sheets

ONLINE COMPUTATION OF CACHE OCCUPANCY AND PERFORMANCE

BACKGROUND

1. Field of the Invention

The present invention relates to methods, computer programs and systems for online measurement of computer resource utilization, and more particularly, methods, computer programs and systems for managing thread performance in a computing environment based on its cache occupancy and performance.

2. Description of the Related Art

Operating systems, hypervisors, and other runtime systems are designed to distribute hardware resources across multiple clients with varying degrees of service levels and priorities. A hypervisor, sometimes referred to as a virtual machine monitor, is a virtualization platform that allows multiple operating systems to run on a host computer at the same time. Clients include threads, processes, applications, virtual machines, other software contexts, etc. Administrators and users manage resource allocation policies by specifying settings that aim to determine how the different clients are serviced, sometimes aimed at enforcing guaranteed service rates or service-level agreements. These policy settings may include process priorities, reservations, proportional-share weights, etc.

In order to provide effective quality of service to a client, software must first be able to measure the client's actual resource consumption accurately, as well as resource consumption by other clients in the system. One critical resource that determines client performance is the client's consumption and utilization of processor cache memory. While various techniques exist for obtaining information for resources such as processor time and main memory space, there are no known software methods for accurately estimating per-client consumption and utilization of processor cache memory. Although cache effects are critical to performance in modern systems, software typically provides little, if any, control over cache allocations. For instance, page coloring is one approach, but it is not efficient. Manual tuning works poorly because of constantly changing usage patterns. Trial-and-error techniques, even after much labor, fail to be accurate, as usage demands change constantly. Additionally, cache resource management is becoming increasingly important as modern processors typically share a common hardware cache across multiple competing hardware contexts, such as cores and hardware threads. There is a significant speed discrepancy between main memory and cache memory, the latter being clocked at processor speeds, leading to as many as several hundred processor clock cycles of stall time on cache misses. Management of a limited resource, such as an on-chip cache, is becoming increasingly important as both the number of cores, and the disparity between processor and memory speeds increase.

It is in this context that embodiments of the invention arise.

SUMMARY

Embodiments of the present invention provide methods, computer programs, and systems for managing thread performance in a computing environment based on cache occupancy. It should be appreciated that the present invention can be implemented in numerous ways, such as a process, an apparatus, a system, a device or a method on a computer readable medium. Several inventive embodiments of the present invention are described below.

In one embodiment, a computer implemented method assigns a thread performance counter to threads being created to measure the number of cache misses for the threads. The method further calculates a self-thread value as the change in the performance counter of a given thread during a predetermined period, and an other-thread value as the sum of the changes in the performance counters of all the threads except for the given thread, during the same period. Further, the method estimates a cache occupancy for the given thread based on a previous occupancy for the given thread and the calculated self-thread and other-thread values. The estimated cache occupancy is used to assign computing environment resources to the given thread. In another embodiment, a computer program implements the method.

In one embodiment, a system to manage thread performance in a computing environment includes a computer device having a plurality of processors, a memory and a shared last level cache. The memory includes a resource allocation program, which when executed by a processor from the plurality of processors causes the processor to assign a thread performance counter to threads being created in the computing environment. The thread performance counter measures the number of cache misses for the corresponding thread. The program further calculates a self-thread value S as a change in the thread performance counter of a given thread during a predetermined period, and an other-thread value O as the sum of all the changes in the thread performance counters during the predetermined period except for the given thread. In addition, the program estimates the cache occupancy for the given thread based on a previous occupancy E for the given thread, S and O. The program uses the estimated cache occupancy to assign computing environment resources to the given thread.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe a method, a computer program, and an apparatus for managing thread performance in a computing environment. The method includes the estimation of per-client cache occupancy for use in commodity or custom multi-core and multi-threaded processors. Starting with a probabilistic model of cache behavior, a series of approximations are derived for computing per-client cache occupancy efficiently. The inputs to these approximations are simple aggregate cache miss counts, which are available by reading hardware performance counters found on modern commodity processors (e.g., L2_LINES_IN performance counter on Intel Core® processors). Other custom processors and other performance measurements can also be utilized. In one embodiment, the occupancy approximations are computed efficiently, making them suitable for dynamic resource allocation decisions in production systems. Different embodiments use alternative methods of estimating cache occupancy depending on the accuracy required and the need for computational efficiency. The cache occupancy for a given client can be updated at any point in time, such as when a client is descheduled or when a periodic timer generates an interrupt.

In one embodiment, dynamic online construction of per-client cache performance curves is performed. One embodiment of a cache performance curve includes a cache miss-rate curve (MRC) representing the expected cache miss rate that a client would incur at different cache occupancies, and enabling the determination of marginal performance gain (or loss) from allocating more (or less) cache space to the thread. When a client's occupancy estimate is updated, the miss rate corresponding to this occupancy in the corresponding MRC is also updated. In one embodiment, cache occupancies are quantized into a relatively small number of buckets, such as 8 or 16 (or more), while different values are also possible in other embodiments. The use of such a compact representation improves the efficiency of updates and conserves memory. MRCs also enable the automatic identification of phase changes in client behavior.

For description purposes, cache performance is described within the scope of virtualized systems, but the embodiments described herein apply to other systems beyond virtualized systems. Embodiments of the present invention can be used in many different types of software systems, such as traditional operating systems, hypervisors, and other runtime systems.

Figure 1:
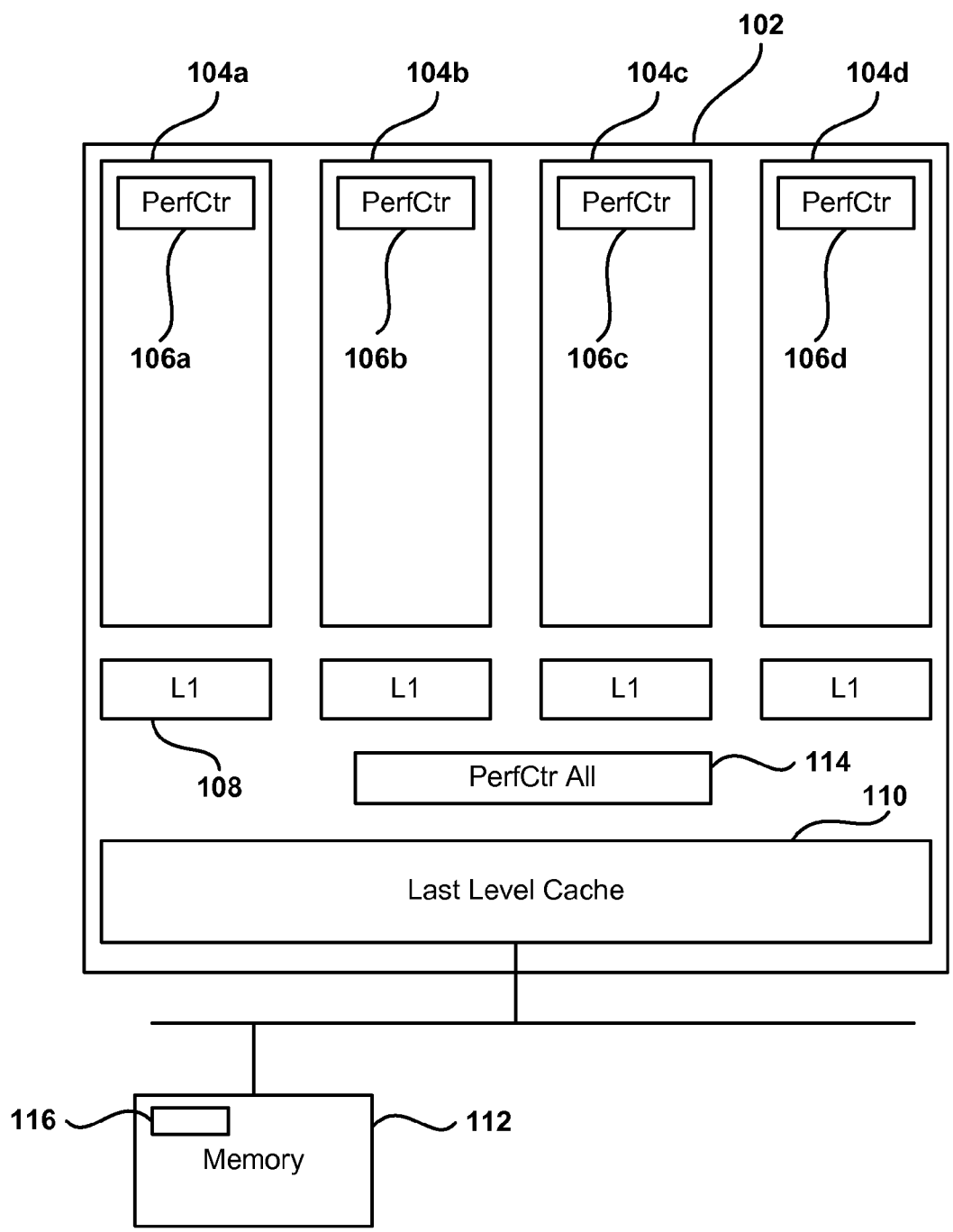
FIG. 1 depicts a computing environment with a last level cache (LLC) shared by several processors.

FIG. 1 depicts a computing environment with a last level cache (LLC) 110 shared by several processors. Processor 102 includes four cores 104a-d, where different processes execute. Cache memory in a computer system is organized in a hierarchy of levels, and the last level cache refers to the level in the cache hierarchy that access memory directly. The last level cache can be private for each core, or can be shared by multiple cores. In one embodiment, a first level cache L1 is associated with each of the cores and a Last Level Cache 110 is shared by all the cores. LLC 110 is connected to one or more memory modules 112 to load or store data.

In one embodiment, performance counters (PerfCtr) 106a-d are associated with each running core. "A PerfCtr for one core may be associated with different software contexts (also referred to herein as clients or software threads) that are scheduled on that core over time. When the scheduler assigns a software context to start executing on a hardware context, the scheduler reads the current value of the hardware performance counter associated with that hardware context. When the counter is read again later to perform an update (e.g. when the software context is descheduled, or in response to a periodic timer), the old baseline value is subtracted from the current value of the performance counter to assign this difference to the corresponding software thread. In one embodiment, a thread performance counter 116 for each software thread (only the performance counter associated with one thread shown) is kept in memory 112. In another embodiment, only a subset of the threads is selected for tracking, and only the selected threads are assigned thread performance counters.

Other embodiments use different types of performance measurements, such as resources used, status flags, event flags, timers, wait times, run times, age, etc. The performance counter enables software to get an indication of a performance metric associated with the thread. In one embodiment, PerfCtr indicates the number of cache misses experienced by the corresponding core. Other performance metrics include instructions retired, memory references, cache references, branch mispredicts, memory stall cycles (cycles for which a core or a processor is stalled and not issuing new instructions because it is waiting for memory), etc. PerfCtr All 114 is another performance counter associated with the LLC. In the case where PerfCtrs are used to measure cache misses, PerfCtr All 114 counts all the cache misses for LLC 110. In one embodiment, PerfCtr All is not provided directly by the underlying architecture, and PerfCtr is instead implemented as the sum of the PerfCtrs associated with the different cores. When a global hardware performance counter (PerfCtr All) is not available, computing the aggregate sum in software may cause some inaccuracy as the current hardware values cannot be read by software, and software must instead sum the values last read by each local core.

One embodiment uses the current generation of x86 processors from Intel and AMD, but any other computing architecture that also shares a common cache among multiple cores or threads within the same physical processor socket can be used.

The following describes an embodiment of a method to estimate the cache occupancy of threads. To describe the rationale behind the equations used in the different embodiments, a simple "balls in bins" model is used for easier understanding of how the different formulas described below apply to the cache occupancy determination specifically, and how they apply to the estimation of resource use in a computing environment in general. In one embodiment, a shared last-level cache is used, while other types of caches are used in other embodiments of the invention. The shared last-level cache may be n-way set associative or direct-mapped. The method estimates the current cache occupancy by a thread τ at a time t, given the contention for cache lines by multiple threads running on all the cores that share the LLC. At any given time t, a thread τ may be active on one core while other threads are active on the remaining cores, or thread τ may be de-scheduled.

In general, today's hardware caches reveal little information for the purpose of deriving spatial or quantitative information about cache usage. In one embodiment, hardware performance counters are used together with inference techniques to estimate cache usage. Virtually all modern processors provide performance counters through which information about various system events can be determined, such as instructions retired, cache misses, cache evictions and cycle times for execution sequences. Using two events, namely the local and global last-level cache misses, an estimate of the number of cache lines $C_i(t)$ occupied by thread $\tau_i$ at time t is derived. The global cache misses value is defined as the cumulative number of cache misses across all cores that share the same last-level cache.

In one embodiment, two assumptions for estimating cache occupancy are used. First, the cache is accessed uniformly at random. Second, the method relies on direct-mapped caches (i.e., hash structures). Other embodiments described below expand the method to dismiss the second assumption. The first assumption does not apply in most cases because of the locality properties of most typical threads, resulting in heavy-tailed distributions of cache access patterns. Notwithstanding, in the absence of spatial knowledge about the precise subset of "hot" cache lines for a thread's current phase of execution, assuming a uniformly random distribution of cache accesses suffices for the model described below.

Cache occupancy is, to a certain degree, dictated by the number of misses experienced by a thread because cache lines will be allocated in response to such misses either by pre-fetching or demand-fetching. Essentially, the current execution phase of a thread influences the thread's cache investment, because typical eviction policies tend to favor evicting lines not used for some time, such as a pseudo Least-Recently Used (LRU) replacement policy. Pseudo LRU is an efficient algorithm for finding an item that most likely has not been accessed very recently, given a set of items and a sequence of access events to the items. In one embodiment, the underlying architecture tracks the "least recently used" information for a pair of cache lines instead of tracking just a single cache line. After the least recently used cache line pair is selected, one cache line within the pair is selected randomly. This method accomplishes close-to-exact LRU behavior with lower hardware complexity. Any evicted lines no longer relevant to the current execution phase of $\tau_i$ will not be returned to the cache due to subsequent misses. Hence, the cache occupancy of a thread is a function of cache misses experienced by it over a time interval.

Returning to the "balls in bins" analogy, a few terms used in the model are introduced below:
- C uniformly random accessed cache lines are represented by bins. In a set-associative cache, the value C represents the sets of hashed cache lines.
- $\sigma_r$ represents the number of red balls. This term corresponds to the number of misses, hereinto referred as S, experienced by a chosen thread $\tau_r$ under observation, and represents the number of cache lines (or bins) allocated to thread $\tau_r$ due to misses.
- $\sigma_b$ represents the number of blue balls. This term corresponds to the number of misses, herein referred to as O, by each and every thread $\tau_b$ other than $\tau_r$, $\forall b \neq r$. The misses occur on all cores of a multi-core processor which cause cache lines (and, hence, bins) to be allocated in response to such misses.
- Each bin is infinitely deep and one ball wide, so only the top ball is visible when looking into the bin.

If there are C bins and $\sigma_r$ red balls thrown at random, then the first question is "how many unique bins contain red balls after all balls are thrown?" Let $Z_i$ represent a Bernoulli random variable whose value is 1 if a bin is occupied by a red ball and 0 otherwise. The expected number of bins with red balls, denoted E[Z] or simply E, equals $\Sigma_{i=1}^N E[Z_i]$. This assumes that the expectation of each Bernoulli random variable is independent of all other random variables, which is the case if $\sigma_r$ is sufficiently large. It should be noted that, if $\sigma_r$ is sufficiently small, the probability that a given bin is occupied will approach 0 if all balls have been thrown into different bins. Over the lifetime of a system executing threads, misses will continue to occur and, by analogy, balls will be essentially limitless.

$E[Z_i]$ is the probability that bin i is occupied by a red ball, which is the same as [1−Pr{bin i is empty}]. However, Pr{bin i is empty} is equal to $$\left(1 - \frac{1}{C}\right)^{\sigma_r}$$

after $\sigma_r$ independent balls are thrown. Therefore, $$E[Z_i] = 1 - \left(1 - \frac{1}{C}\right)^{\sigma_r}.$$

Consequently, $$E = C\left(1 - \left(1 - \frac{1}{C}\right)^{\sigma_r}\right)$$

which approximates to $$C\left(1 - e^{-\frac{\sigma_r}{C}}\right).$$

Intuitively, the value of E grows from 0 to the maximum number of bins (or cache capacity), with exponentially more balls (or misses) needed to fill additional bins (or cache lines) as the current occupancy increases. This makes sense, because as more bins are occupied, there is a greater probability that a ball will land in an already occupied bin.

When a thread, whose cache misses are represented by red balls $\sigma_r$, is de-scheduled then other threads may run, and the misses will cause evictions of red balls from bins. Similarly, on multi-core architectures with a shared cache, concurrent threads on other cores will be competing for bins (or cache lines) at the same time as thread $\tau_r$ under observation. For simplicity, the method corresponding to one embodiment is described for two cores with a shared cache. However, the method generalizes to a system with M cores sharing a given cache. The blue balls represent all misses from each and every thread, $\tau_b | b \neq r$. Thread $\tau_b$ executes on a second core during the concurrent execution of $\tau_r$ on the first core. This scenario corresponds to the "balls in bins" problem with two ball colors, red and blue, and the problem is finding out how many bins have visible red balls when a finite sequence of red and blue balls have been thrown at random into C bins.

Each time a blue ball lands in a bin previously occupied by a red ball, the top visible ball is blue. This corresponds to the case where a cache line for $\tau_r$ is evicted to make way for some thread, $\tau_b$. Self collisions are also possible, causing multiple balls of the same color to land in the same bin, but only the top ball is visible. Given the probability of any two balls landing in the same bin, the probability of the top-most ball being red or blue is simply dependent on the ratio of red to blue balls. That is, to determine the number of bins with visible red balls, the expected occupancy by red balls E is calculated.

$E$ is equal to $\frac{\sigma_r}{\sigma_r + \sigma_b} E[Z']$, where $E[Z']$ is the expected number of bins occupied by either red or blue balls. When only red balls are thrown, the expected occupancy is $$C\left(1 - e^{-\frac{\sigma_r}{C}}\right),$$

therefore $$E[Z'] = X\left(1 - e^{-\frac{\sigma_r + \sigma_b}{C}}\right).$$

Consequently, the expected occupancy of red balls, after $\sigma_r + \sigma_b$ balls have been thrown is:

$$E = \frac{\sigma_r}{\sigma_r + \sigma_b} C\left(1 - e^{-\frac{\sigma_r - \sigma_b}{C}}\right) \quad (1)$$

If the rate of misses by threads on both cores is the same, such that $\sigma_r = \sigma_b$, then the expected cache occupancy of $\tau_r$ approaches 50 percent of the cache capacity (i.e., C/2). If every independent thread is represented by its own ball color, then the cache occupancy of each thread would approach C/c, where c represents the number of unique ball colors.

As noted above, any computer architecture can be used as long as the cores share a memory cache. For purposes of example only, when using an architecture such as Intel Core® architecture, the number of misses experienced by $\tau_r$ is tracked for any specific interval of clock cycles, where $\tau_r$ is a thread whose cache occupancy is to be determined. In a system with two cores, the Intel performance counter event that represents local core misses in the L2 cache is L2_LINES_IN (with a mask setting set to the local core). By changing the event mask, L2_LINES_IN captures cache miss events on both cores. Hence, L2_LINES_IN (local) is representative of S, while L2_LINES_IN (both) is representative of S+O (i.e., the total misses across a pair of cores by $\tau_r$ and all other threads $\tau_b$).

Figure 2:
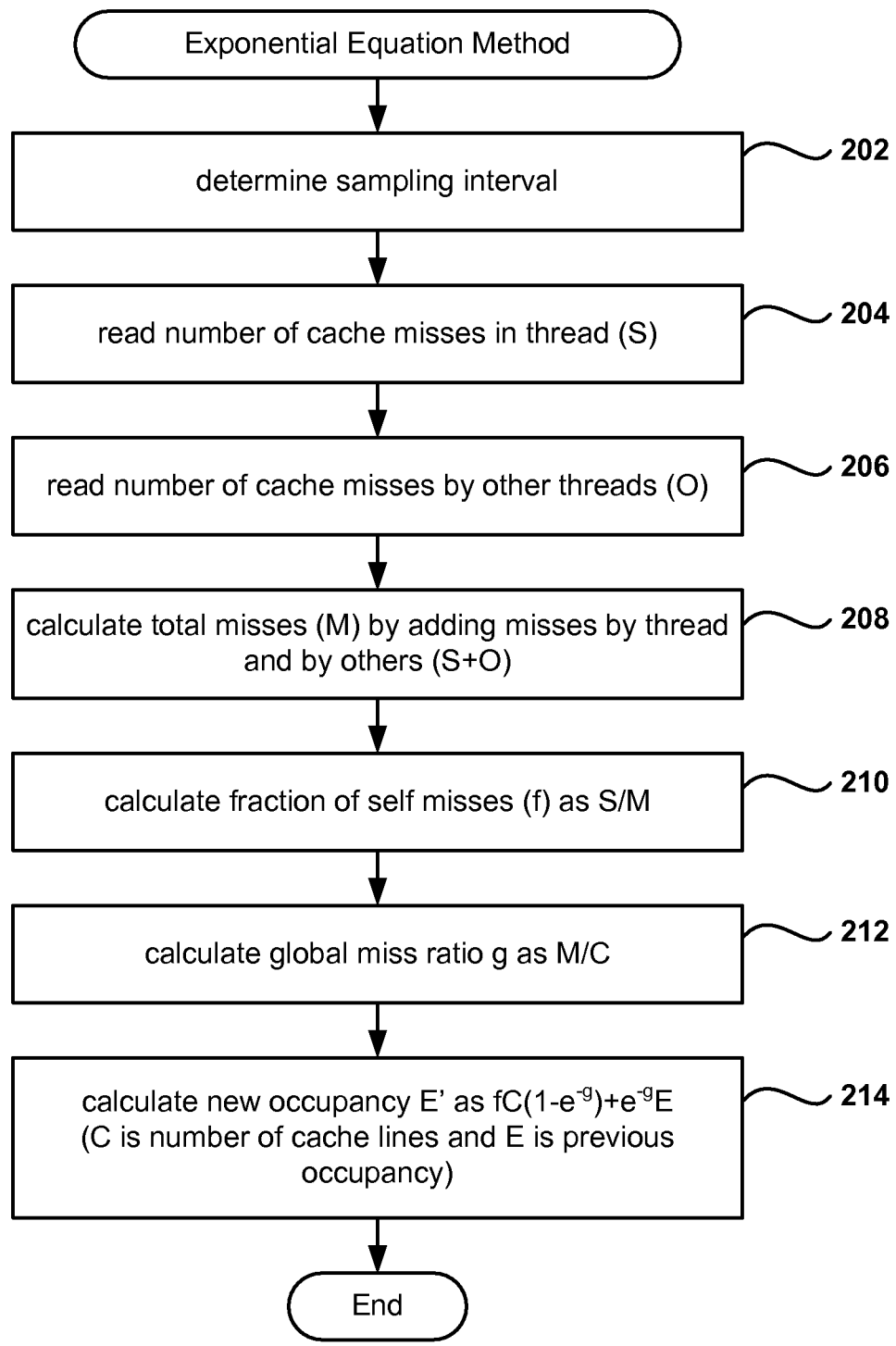
FIG. 2 shows the process flow for the Exponential Equation method for calculating cache occupancy, in accordance with one embodiment.

FIG. 2 shows the process flow for the Exponential Equation method for calculating cache occupancy, in accordance with one embodiment. In operation 202 the sampling interval is set. The number of misses S by the thread under observation is read in operation 204, and the number of cache misses by all threads except for the thread under observation, O, is read in operation 206.

The total number of misses, M, is calculated by adding S+O. In another embodiment, M is read from a global counter, and then O is calculated as (M−S). In operation 210, the ratio of self misses f is calculated by the fraction S/M. Similarly, the global miss ratio g is calculated as M/C. In operation 214, the new occupancy E' of the thread under observation is calculated, based on the previous occupancy E, as $fC(1-e^{-g}) + e^{-g}E$.

Figure 3:
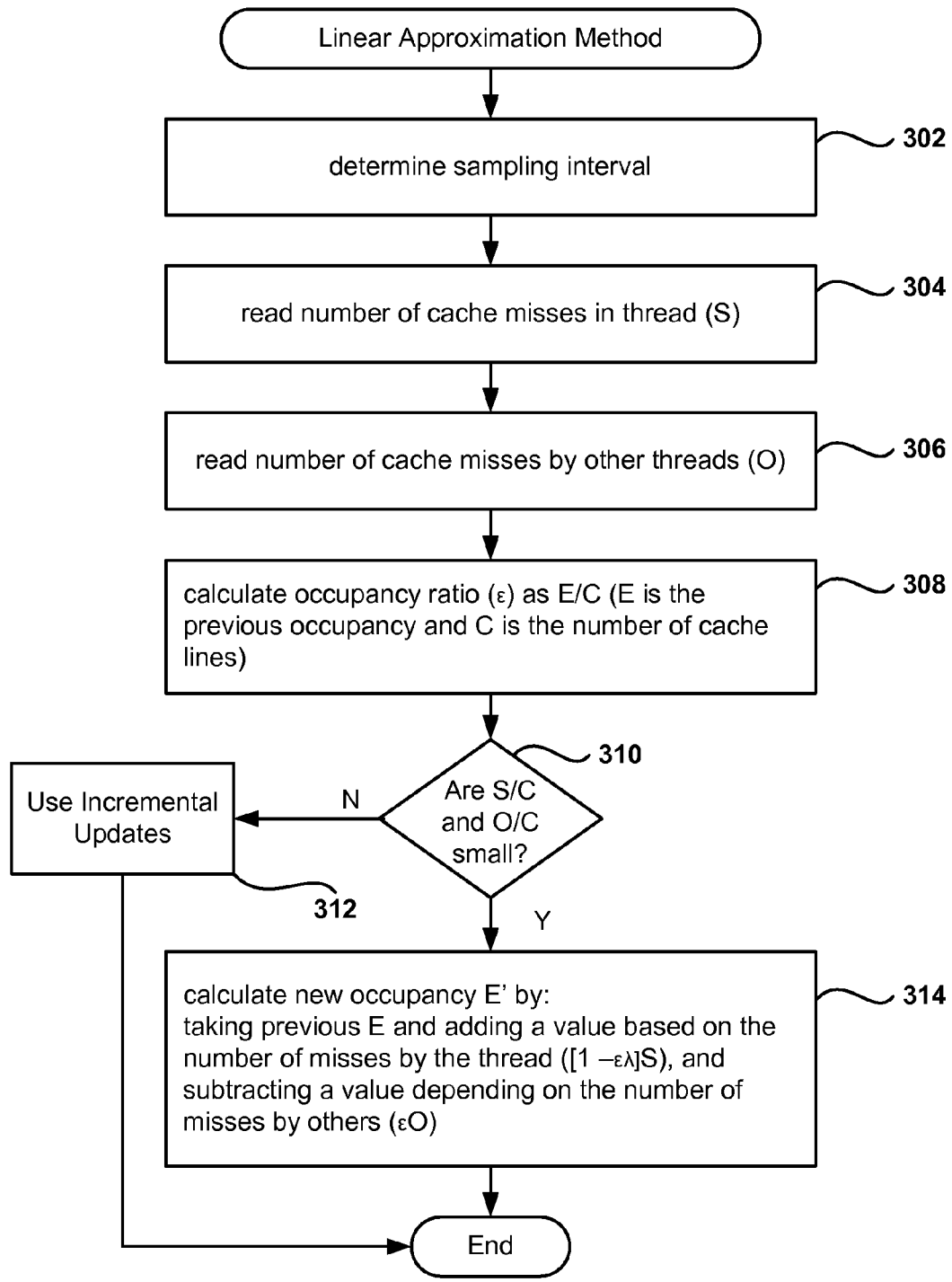
FIG. 3 shows the process flow for the Linear Approximation method for calculating cache occupancy, according to one embodiment.

FIG. 3 shows the process flow for the Linear Approximation method for calculating cache occupancy, according to one embodiment. When using cache occupancy estimates for CPU scheduling, the calculation of E as defined in Equation (1) for each $\tau_r$ under observation can be inefficient to compute, in terms of cpu and memory resources. Additionally, equation (1) is based on the assumption that the shared cache starts out empty. If E' is the expected occupancy after a number of misses, a numerical solution based on the misses that occur since the previous estimate of cache occupancy E can be derived. Specifically, the newly expected cache occupancy of $\tau_r$ after generating $\sigma_r$ misses in a predetermined interval, $\delta_r$, during which all other threads generate $\sigma_b$ misses is:

$$E' = \frac{\sigma_r}{\sigma_r + \sigma_b} C\left(1 - e^{-\frac{\sigma_r + \sigma_b}{C}}\right) + e^{-\frac{\sigma_r + \sigma_b}{C}} E \quad (2)$$

Using terms related to the cache performance instead to "balls in bins" terms, equation (2) can be rewritten as:

$$E' = \frac{S}{S + O} C\left(1 - e^{-\frac{S+O}{C}}\right) + e^{-\frac{S+O}{C}} E \quad (2')$$

The difference between equations (1) and (2) is the addition of the last term in equation (2) capturing the fraction of the previous occupancy unaffected by the latest set of misses. To approximate exponential occupancy curves (1) and (2), a piecewise-linear model is presented. The linear model approximates the expected occupancy of $\tau_r$ as follows:

$$E' = E + (1-\epsilon)S - \epsilon O \quad (3)$$

In Equation (3), $\epsilon$ represents the fraction of the total cache lines currently expected to be occupied by $\tau_r$. That is, $$\varepsilon = \frac{E}{C}.$$

While the exponential equations are more precise, the piecewise-linear approximation can be evaluated more efficiently, making the linear approximation more practical for dynamic, online computations in critical code paths, such as the CPU scheduler for an operating system kernel or hypervisor.

In one embodiment, equation (3) is rewritten to facilitate maintaining cache occupancy estimates via incremental updates. In this method, occupancies are represented as fractions of the cache size C. Dividing equation (3) throughout by C the following is obtained:

$$\frac{E'}{C} = \frac{E}{C} + (1-\varepsilon)\frac{S}{C} - \varepsilon \frac{O}{C}$$

Which is equivalent to:

$$e' = \epsilon + (1-\epsilon)*s - \epsilon*t \quad (4)$$

Where e'=E'/C, s=S/C, and t=O/C. Equation (4) is sensitive to the values of s and t. For large values of s and t, the linear model becomes less accurate, since the occupancy update is more coarse-grained. One approach for improving accuracy is to perform several fine-grained updates instead of a single coarse-grained update. In one embodiment, N separate updates are performed, using s/N and t/N for each. Another embodiment avoids the overhead of multiple updates and is particularly useful when S+O>kC, where k is a predetermined constant. In one embodiment, k is equal to three, but other values are also possible. The method uses scaled cache miss values, normalized by (S+O), that is, S/(S+O) and O/(S+O), instead of the raw values of S and O. In one embodiment, both of these improvements are used contemporaneously.

One embodiment for estimating occupancy using the linear approximation method is described in FIG. 3. The method begins by determining a sample interval in operation 302. Similar to what is performed in the exponential model of FIG. 2, the number of cache misses S and the number of misses by other threads O are read in operations 304 and 306. In operation 308, the occupancy ratio $\epsilon$ is calculated as the fraction E/C.

The linear model is not accurate when S/C or O/C is bigger than a predetermined value. In one embodiment, the predetermined value is 1/8, but other values are also possible. For example, if C is 64,000, then any value of S smaller than 8,000 will cause a ratio of S/C of less than 1/8 and the linear approximation method is considered accurate. The S/C ratio is checked in operation 310, and if S/C or O/C is not smaller than this threshold value, then the method continues onto operation 312 to use incremental updates, as previously described with respect to equation (4). Otherwise the method continues onto operation 314.

Another embodiment does not combine the linear method with incremental updates and operation 310 is not performed, where the method flows directly from operation 308 to 314. In operation 314, the new occupancy E' is calculated applying equation (3) as previously described.

Figure 4:
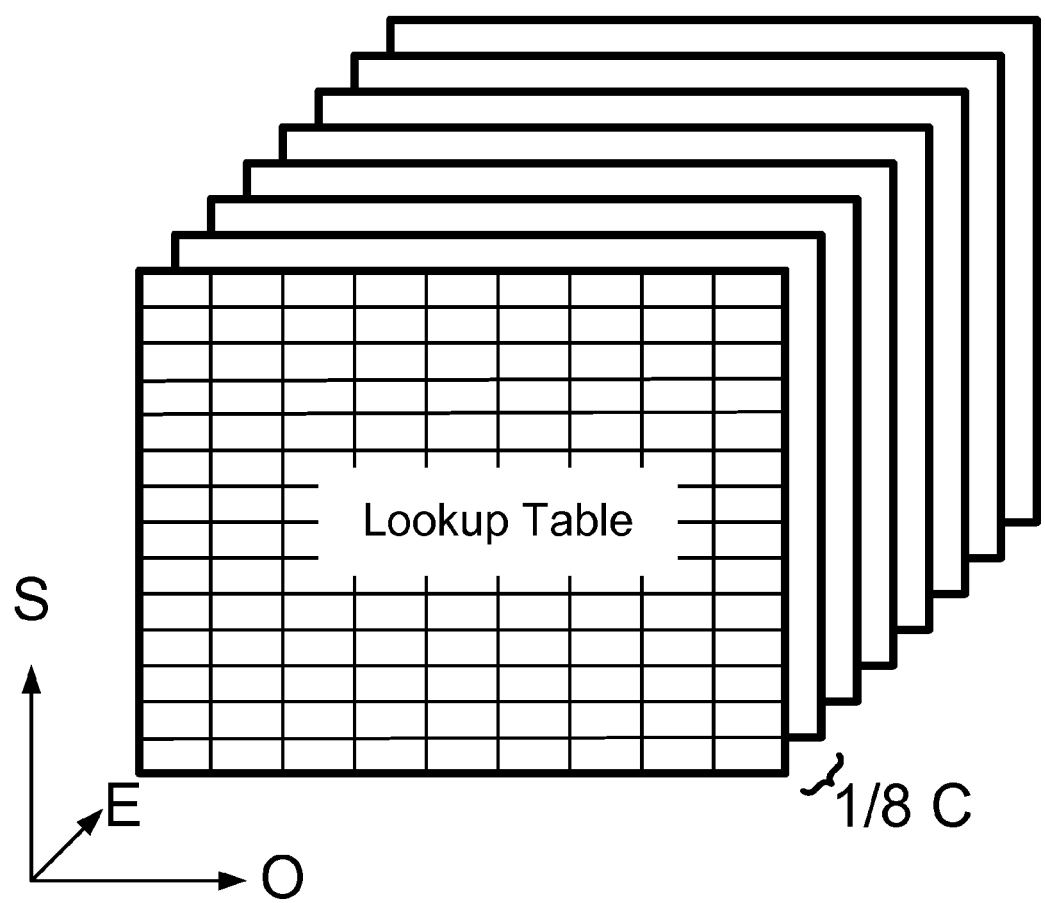
FIG. 4 depicts a three-dimensional lookup table for estimating cache occupancy in accordance with one embodiment of the invention.

Yet another approach for improving the efficiency of occupancy updates is to use a lookup table. FIG. 4 depicts a three-dimensional lookup table for estimating cache occupancy in accordance with one embodiment of the invention. The three dimensions in the lookup table are previous occupancy E, self misses S, and other's misses O. In one embodiment, the occupancy estimates are represented by a small number of buckets (such as 8 or 16), enabling the use of a limited number of bits can be used for representing E, S, and O. In the embodiment shown in FIG. 4, the E dimension is divided into 8 buckets, where the size of each bucket is one eighth of the number of cache lines C.

In another embodiment, the three dimensions of the lookup table correspond to the parameters $\epsilon$, s, and t, as previously described with respect to equation (4). The fixed-table can be pre-computed when quantizing (using buckets) for the different dimensions. The table is indexed by the inputs $\epsilon$, s, and t, that directly yields the output e' without performing any arithmetic operations. In one embodiment where 6 bits are used to represent each value, the lookup table can be stored in about 256 KBytes.

Figure 5:
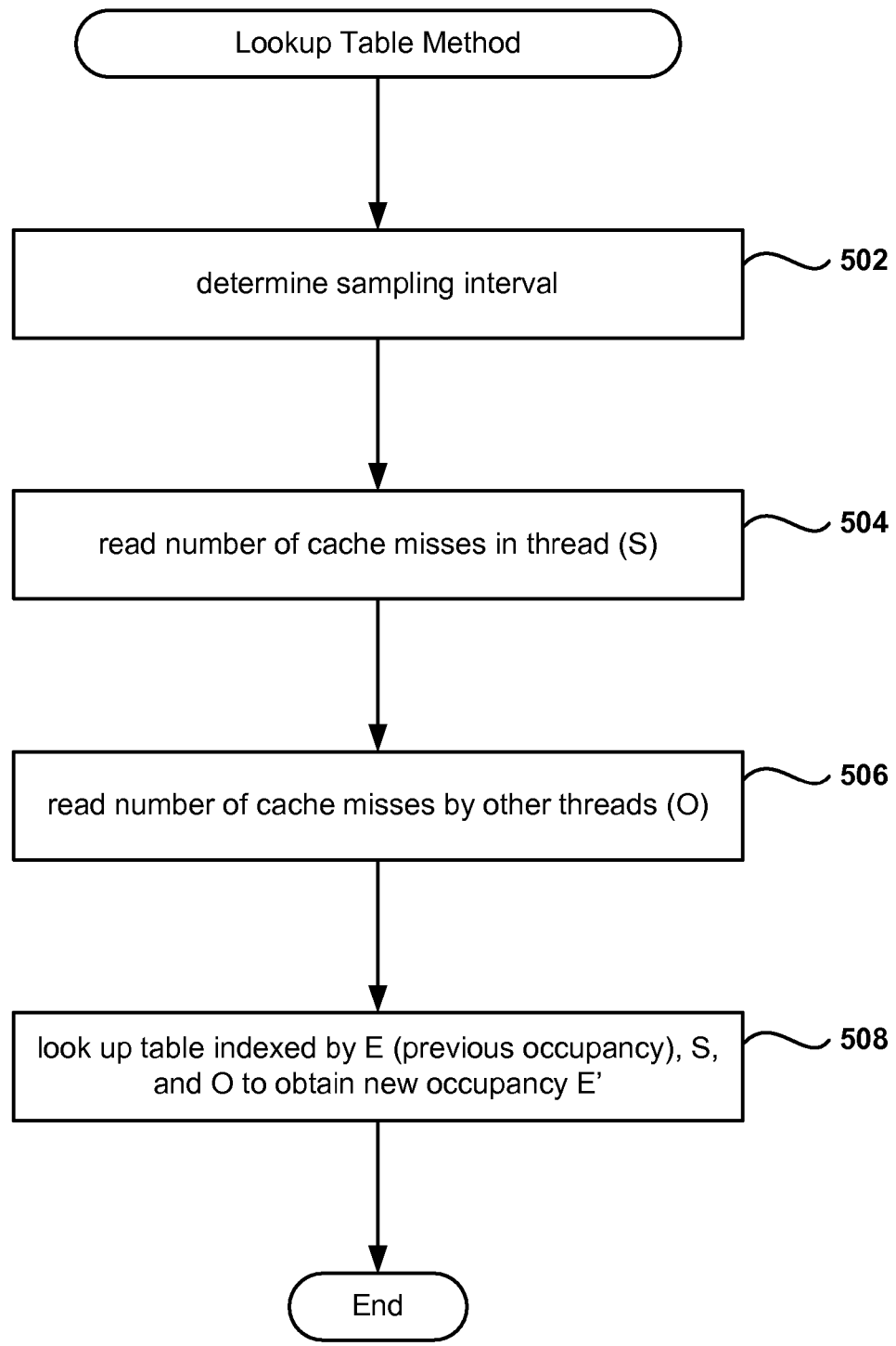
FIG. 5 shows the process flow for the Lookup Table method for calculating cache occupancy, according to one embodiment.

FIG. 5 shows the process flow for the Lookup Table method for calculating cache occupancy, according to one embodiment. In operation 502, the sampling interval for measuring the number of cache misses is determined. The number of misses in the thread S and the number of misses by other threads) are read respectively in operations 504 and 506. The new occupancy E' is read from the table based on the previous occupancy E, S, and O.

Figure 6:
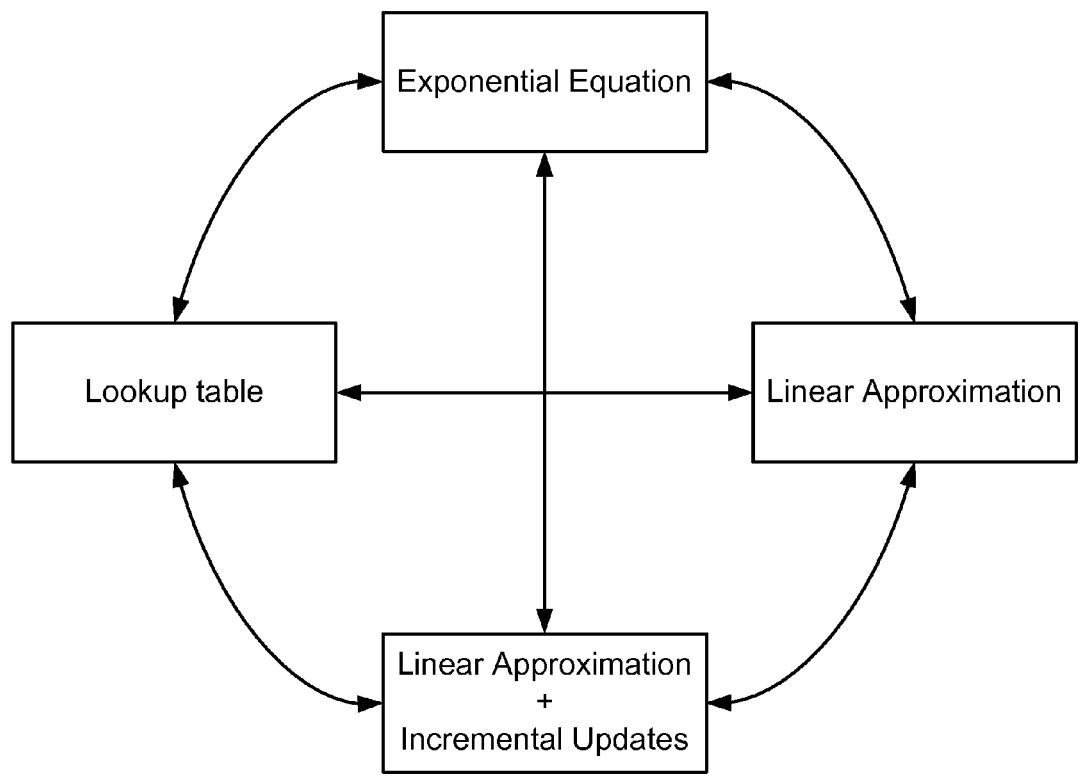
FIG. 6 shows different methods of estimating cache occupancy according to one embodiment.

FIG. 6 shows different methods of estimating cache occupancy according to one embodiment. As previously discussed, there are different ways of determining the occupancy E of a given thread. The person skilled in the art will readily appreciate the tradeoffs between speed, accuracy, resources, etc. For example, a lookup table can provide fast measurements of E at the cost of more use of memory. In one embodiment, the methods can be combined according to system parameters, such as the one shown in FIG. 3 that uses a linear approximation approach when S/C is sufficiently small and incremental updates otherwise.

Figure 7A:
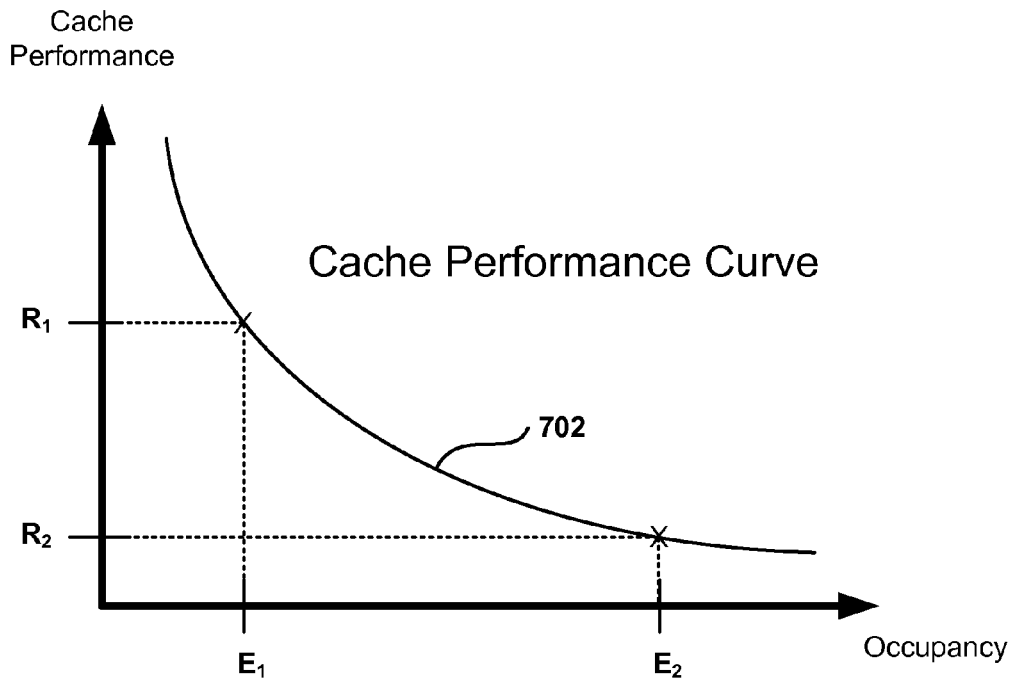
FIGS. 7A-7D depict cache performance curves showing the relationship between cache occupancy and cache performance, according to different embodiments.

FIGS. 7A-7D depict cache performance curves showing the relationship between cache occupancy and cache performance, according to different embodiments. FIG. 7A depicts a cache performance curve relating occupancy and cache performance for a given thread. Once a client's cache occupancy is estimated several times over a period of time, a cache miss-rate curve 702 is constructed for the client. A miss-rate curve (MRC) depicts the expected number of misses per time unit that a client would incur at different cache occupancies. For example, miss rate $R_1$ at occupancy $E_1$, miss rate $R_2$ at occupancy $E_2$, etc. In one embodiment, the MRC is used for scheduling and managing resources by relying on the quantitative information provided by the MRC about the expected performance gain that could be achieved by allocating more cache space to a client, and the expected performance loss that would be incurred by allocating less cache space.

Cache miss-rate is a form of measuring cache performance, but other parameters are also possible to form a cache performance curve. In one embodiment, the occupancy is graphed against a cache miss ratio defined as the number of cache misses divided by the number of cache references. In another embodiment, a cycles-per-instruction (CPI) ratio of the number of processor cycles to the number of thread instructions retired is used as a cache performance measurement. Alternatively, the ratio of instructions retired to processor cycles (called IPC or instructions per cycle) can also be used.

Occupancy estimates may be updated at different points in time. One convenient point for updating a client's occupancy estimate is when the client's scheduling state changes, e.g., when the client is descheduled or rescheduled. Alternatively, occupancies can be updated based on elapsed time, such as in response to a periodic timer interrupt.

In one embodiment, the MRC is stored compressed to conserve memory and to improve the efficiency of dynamic updates. The occupancies are quantized into a small number of buckets, with each bucket representing a fixed fraction of the cache; e.g., 16 buckets each representing one-sixteenth of the cache size.

Figure 7B:
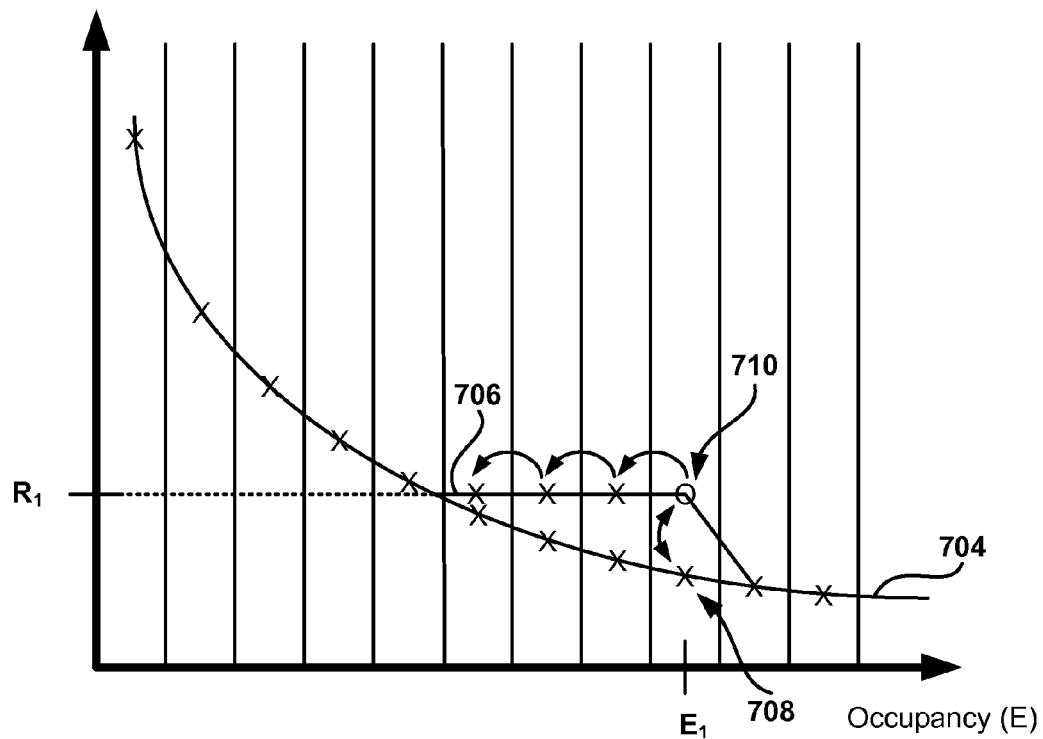

FIG. 7B shows dynamic updates to the MRC according to one embodiment. Increasing cache allocation generally improves, or at least does not degrade, a client's performance, which generally translates into miss-rate curves that are typically monotonically decreasing as cache occupancy increases. This property is used to identify "phase changes" in client behavior. For example, a client may compute for a period of time in one phase of execution, during which the client executes certain regions of code and accesses certain regions of data. At a later point in time, the same client may execute different code and access different data, referred to herein as a different phase of execution. For example, a client may first execute an initialization phase followed by a computation phase. In one embodiment, miss-rate curves are used to detect phase changes by examining the non-monotonicity, or change in the monotonicity, of the MRC.

Updates to MRC 704 are used to explicitly enforce monotonicity. In one embodiment, given a new data point 710 (previously data point 708 for same occupancy $E_1$) where the miss rate at occupancy $E_1$ is $R_1$, each existing miss rate R at occupancies below $E_1$ is changed to MAX(R, $R_1$) (see line 706), and each existing miss rate R at occupancies above $E_1$ is changed to MIN(R, $R_1$).

Figure 7C:
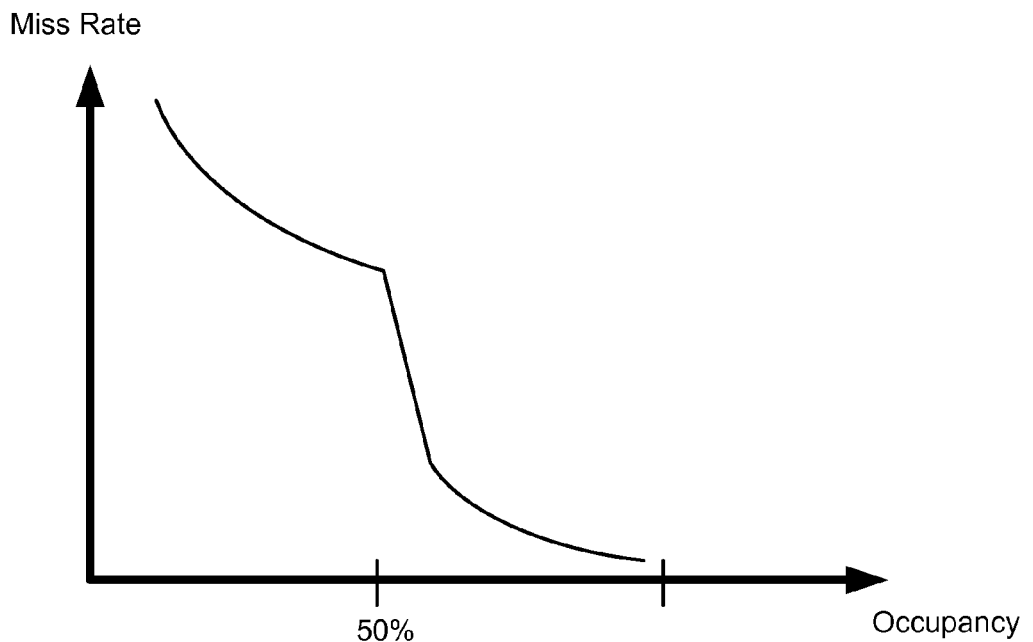

FIG. 7C depicts the behavior of a thread under high occupancy conditions, according to one embodiment. MRC's do not always vary uniformly along the different levels of occupancy. The thread in FIG. 7C shows a steep fall in the value of the miss rate once the occupancy reaches 50 percent, due to the factor that the thread already has in cache most of the data required for processing. Conversely, another thread (not shown) can increase occupancy and miss rate at the same time over some period of occupancy, meaning that information in the cache is no longer relevant to the current execution of the thread.

Figure 7D:
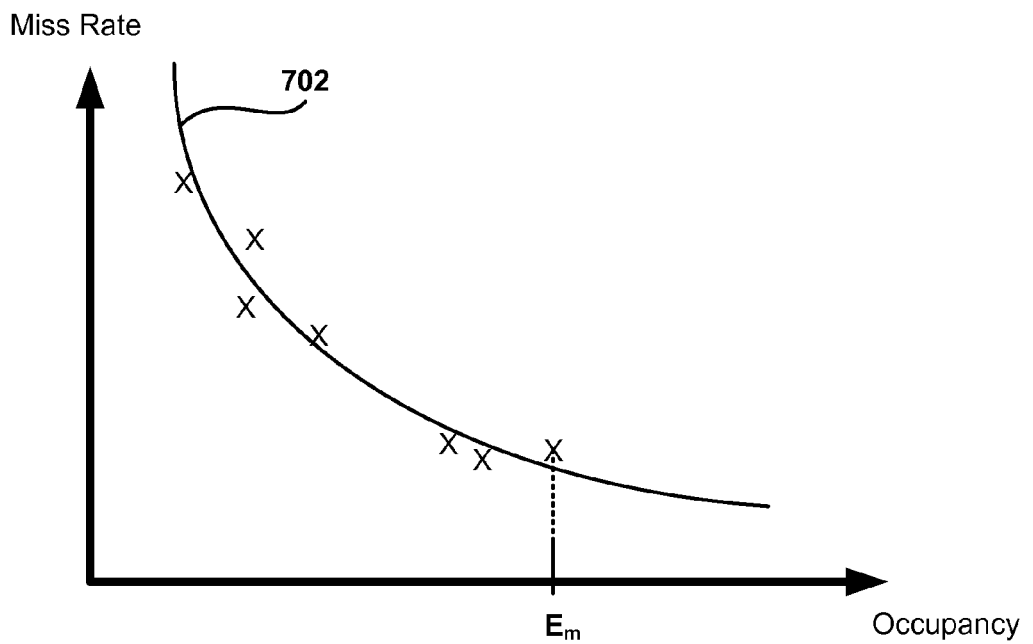

FIG. 7D depicts interpolation techniques used to obtain the MRC. In one embodiment, the MRC for a client is updated dynamically. This is typically done when the client's occupancy estimate is updated, since at that time both occupancy E and miss rate R are available. In one embodiment, the bucket containing the current occupancy E is found, and then the corresponding miss rate is set to the current value R for the bucket. In another embodiment, the miss rate R is not overwritten and instead the miss rate 702 is updated as a function of both the old and new values at occupancy E. This is done by using a simple average or an exponentially-weighted moving average (EWMA). Time-averaging miss rate values smoothes out the curve and partially eliminates noise or variance due to sampling.

Additionally, when multiple clients are competing for shared cache space, the MRC of a given client may be incomplete. If the client's maximum observed occupancy is $E_m$, then there will be no data for occupancy buckets greater than $E_m$. Similarly, it is also possible for data points at other occupancies to be missing, depending on the frequency and granularity of updates. One technique for handling missing data points is to use interpolation techniques, such as simple averaging, linear regression, or other curve-fitting techniques. In one embodiment, if no miss-rate data is available for the bucket representing the largest occupancy, the miss-rate is assumed to be zero. In one embodiment, in order to fill out miss-rate curves (or other occupancy based performance curves), the system allows one thread to run without conflict from other executing threads for a brief period of time (e.g. by idling all but one core).

Figure 8:
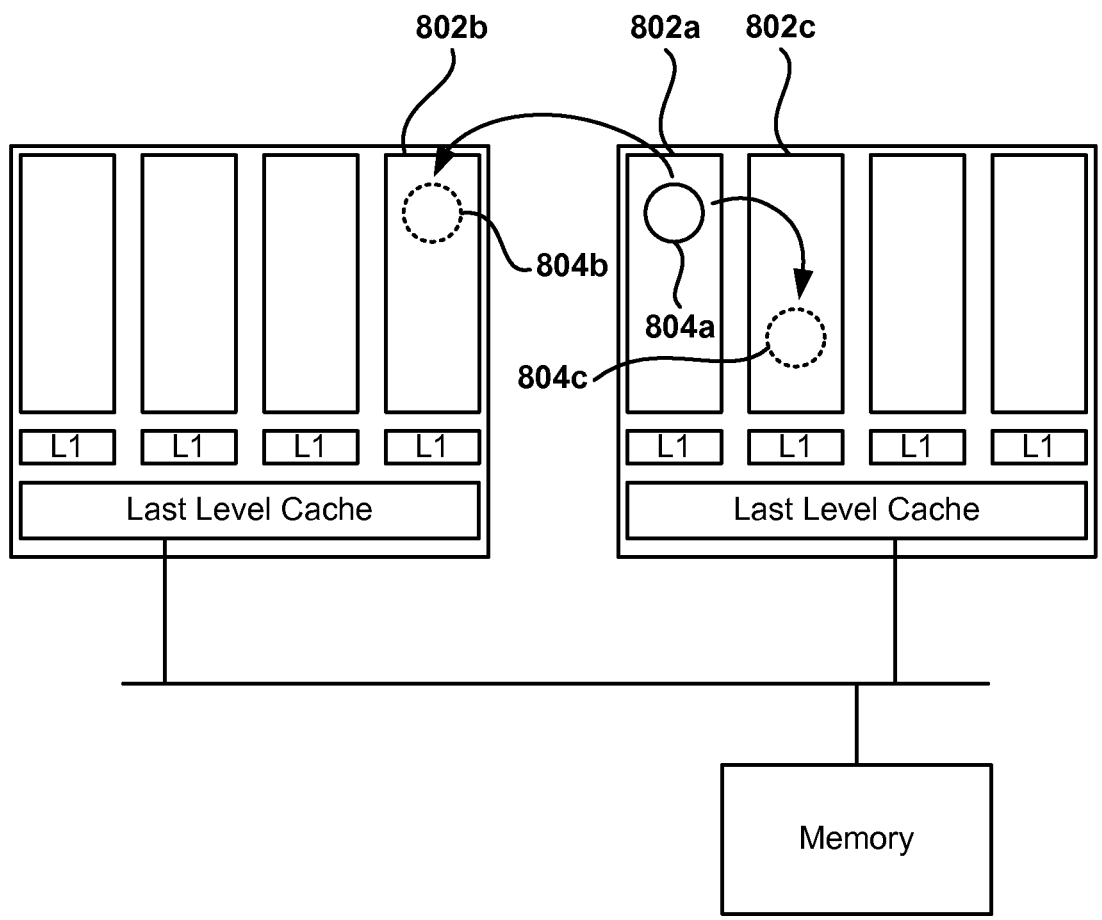
FIG. 8 shows the reallocation of computer resources for one thread according to one embodiment.

FIG. 8 shows the reallocation of computer resources for one thread according to one embodiment. Once the performance parameters for thread 804*a* running in core 802*a* are determined, methods previously described are used to allocate resources to thread 804*a* according to the policies defined in the system for thread 804*a*. Under one management policy, thread 804*a* is allocated more time to run in 802*a* (not shown). Under a different management policy, thread 804*a* is moved to a different core 802*c* as thread 804*c*. Still yet, under another management policy, thread 804*a* is moved to another core 802*b* in a different socket. In other words, the policy can be to run cache-hungry threads with cache-light threads to balance total cache-usage. Yet another management policy is to run many low-priority cache-hungry threads on the same socket, so that they do not conflict with more important threads.

Management policies, typically configured by the user, allocate more cache lines to a thread that will benefit most by an increase in cache lines, or allocate less cache lines to a thread whose performance will not be greatly impacted by a decrease in the number of allocated cache lines. Additionally, management policies can allocate more run time to a thread requiring a large number of computations on a reduced set of data, instead of allocating more cache lines. Another management policy may be to reduce the overall number of cycles that threads in the system have to wait for memory due to cache misses. This type of policy is becoming more important as the price of cache misses is getting more costly (more memory stall time) for running processes.

Figure 9:
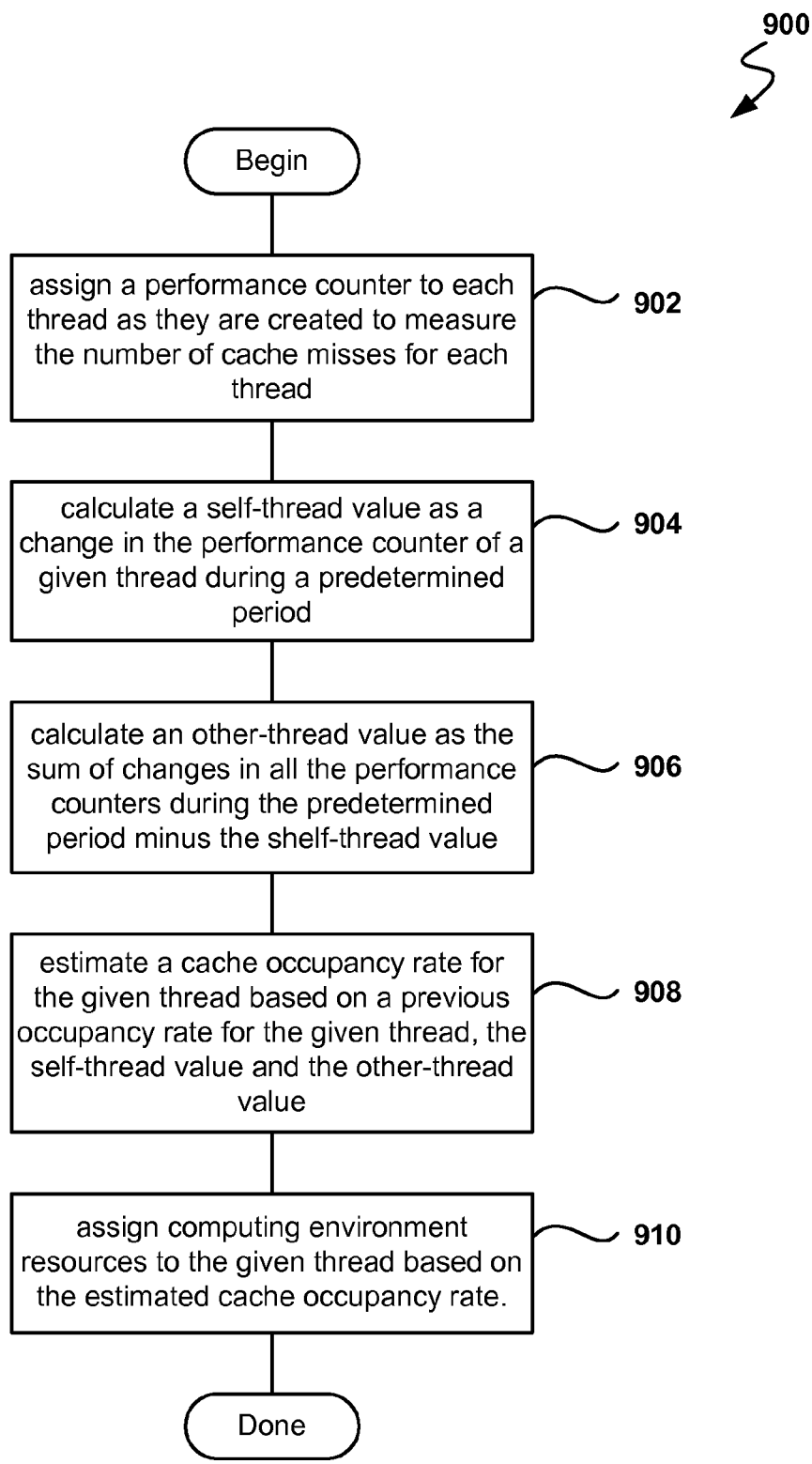
FIG. 9 shows the process flow for managing thread performance in a computing environment in accordance with one embodiment of the invention.

FIG. 9 shows the process flow for managing thread performance in a computing environment in accordance with one embodiment of the invention. In operation 902, the method assigns a thread performance counter to each thread being created in the computing environment to measure the number of cache misses by each thread (see for example thread performance counter 116 in FIG. 1). In one embodiment, the thread performance counter is derived from values in core performance counters, such as PerfCtrs 104*a-d*, as previously described with respect to FIG. 1.

A self-thread value S is calculated in operation 904 as the change in the thread performance counter of a given thread during a predetermined period. In operation 906 the method calculates an other-thread value O as the sum of changes in all the thread performance counters during the predetermined period minus S. See for example PerfCtr All 114 of FIG. 1 to get a number of all the cache misses in the system. In one embodiment, O is calculated as the delta in PerfCtr All 114 during the predetermined period minus S. In another embodiment, O is kept in another per-thread performance counter associated with each thread.

In operation 908 the method estimates a cache occupancy for the given thread based on a previous occupancy E for the given thread, S and O. There are a variety of methods to calculate the occupancy, as seen in FIG. 6. Computing resources are assigned in operation 910 to the given thread based on the cache occupancy estimated in operation 908.

Figure 10:
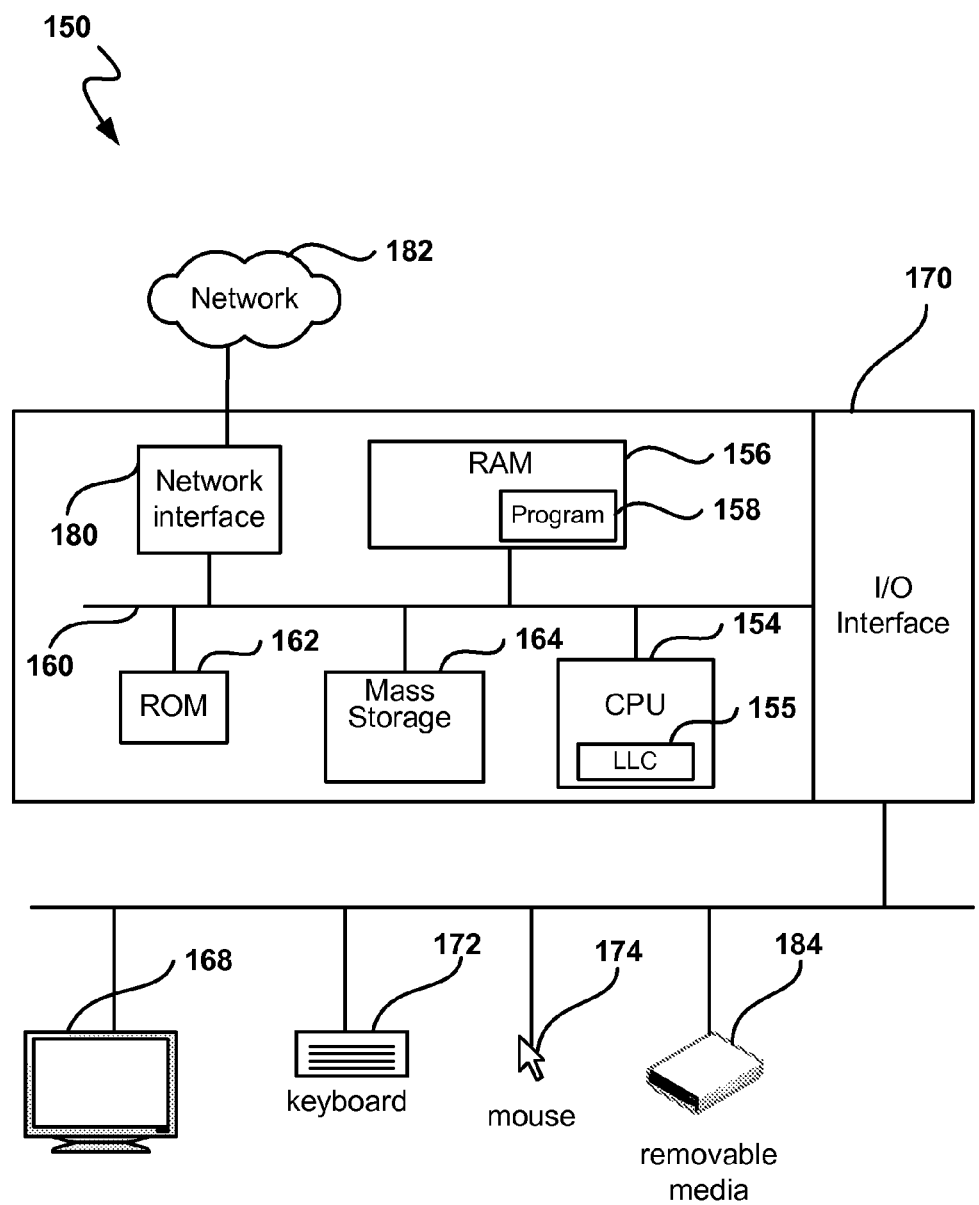
FIG. 10 is a simplified schematic diagram of a computer system for implementing embodiments of the present invention.

FIG. 10 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 154, which is coupled through bus 160 to random access memory (RAM) 156, read-only memory (ROM) 162, and mass storage device 164. CPU 154 includes Last Level Cache 155. Resource Management program 158 resides in random access memory (RAM) 156, but can also reside in mass storage 164.

Mass storage device 164 represents a persistent data storage device such as a floppy disc drive or a fixed disc drive, which may be local or remote. Network interface 180 provides connections via network 182, allowing communications with other devices. It should be appreciated that CPU 154 may be embodied in a general-purpose processor, a special purpose processor, or a specially programmed logic device. Input/Output (I/O) interface provides communication with different peripherals and is connected with CPU 154, RAM 156, ROM 162, and mass storage device 164, through bus 160. Sample peripherals include display 168, keyboard 172, cursor control 174, removable media device 184, etc.

Display 168 is configured to display the user interfaces described herein. Keyboard 172, cursor control 174, removable media device 184, and other peripherals are coupled to I/O interface 170 in order to communicate information in command selections to CPU 154. It should be appreciated that data to and from external devices may be communicated through I/O interface 170. The invention can also be practiced in distributed computing environments where tasks are performed by remote processing devices linked through a network.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method to manage thread performance in a computing environment, the method comprising:
    assigning a thread performance counter to threads being created in the computing environment, the thread performance counter measuring a number of cache misses for a corresponding thread;
    calculating a self-thread value S as a change in the thread performance counter of a given thread during a predetermined period;
    calculating an other-thread value O as a sum of changes in all the thread performance counters during the predetermined period minus S;
    estimating a cache occupancy of a cache for the given thread based on estimating cache misses that occurred since a previous estimate of a previous occupancy E for the given thread using the self-thread value S and the other-thread value O and estimating a fraction of the previous occupancy E unaffected by the cache misses that occurred since the previous estimate using the previous occupancy E for the given thread, the self-thread value S and the other-thread value O, wherein the cache occupancy indicating an estimated amount of data that is stored in the cache for the given thread; and
    assigning computing environment resources to the given thread based on the estimated cache occupancy.

2. The method as recited in claim 1, wherein assigning a thread performance counter further includes,
    assigning a core performance counter to each core,
    first reading the core performance counter when a given thread is scheduled,
    second reading the core performance counter when the given thread is descheduled,
    updating the thread performance counter for the given thread based on the difference between the second reading and the first reading.

3. The method as recited in claim 1, wherein estimating cache occupancy further includes,
    calculating an occupancy ratio for the given thread as the previous occupancy E divided by a number of cache lines C; and
    estimating the cache occupancy for the given thread by adding to the previous occupancy the self-thread value multiplied by one minus the occupancy ratio and by subtracting the other-thread value times the occupancy ratio.

4. The method as recited in claim 3, wherein estimating cache occupancy further includes,
    estimating the cache occupancy for the given thread by using incremental updates when either a fraction S/C or a fraction O/C is bigger than a first predetermined threshold value.

5. The method as recited in claim 3, further including,
    decreasing the value of the predetermined period when a fraction S/C or a fraction O/C is bigger than a second predetermined threshold value.

6. The method as recited in claim 5, further including,
    normalizing S by replacing S with S/(S+O), and
    normalizing O by replacing O with O/(S+O).

7. The method as recited in claim 1, further including,
    creating a three-dimensional lookup table for estimating the cache occupancy, the three dimensions of the lookup table being E, S and O,
    wherein the cache occupancy is estimated by accessing the lookup table.

8. The method as recited in claim 7, further including,
    quantizing E to associate E with a bucket from a plurality of buckets, each bucket from a plurality of buckets covering a different range of possible E values,
    wherein the dimension corresponding to E in the lookup table is quantized according to the plurality of buckets.

9. The method as recited in claim 1, wherein estimating cache occupancy further includes,
    assigning a total misses value M the sum of S and O,
    calculating a self-miss ratio f by dividing S by M,
    calculating a global-miss ratio g by dividing M by a number of cache lines C,
    calculating an exponential factor $\alpha$ as e to the power of minus g, and
    estimating the cache occupancy for the given thread as $fC(1-\alpha)+\alpha E$.

10. The method as recited in claim 1, further including,
    tracking estimated occupancy ratios over a plurality of periods, and
    constructing a cache performance curve based on the tracked occupancy ratios,
    wherein assigning computing environment resources to the given thread further includes accessing the cache performance curve to analyze impact on performance to the given thread when resources are reallocated to or from the given thread.

11. The method as recited in claim 10, further including, detecting changes in the cache performance curve that signal a phase change in the thread, the changes being identified by non-monotonic cache performance curve updates, and changing a cache update policy as a result of the phase change.

12. The method as recited in claim 10, wherein constructing a cache performance curve further includes updating values in the cache performance curve using one of, a simple average algorithm, or an exponentially weighted moving average algorithm.

13. The method as recited in claim 10, wherein constructing a cache performance curve further includes filling unknown values in the cache performance curve by interpolation.

14. A computer program embedded in a non-transitory computer-readable storage medium, when executed by one or more processors, for manage resource performance in a computing environment, the computer program comprising:

program instructions for assigning a thread performance counter to threads being created in the computing environment, the thread performance counter measuring a number of cache misses for a corresponding thread;

program instructions for calculating a self-thread value S as a change in the thread performance counter of a given thread during a predetermined period;

program instructions for calculating an other-thread value O as a sum of changes in all the thread performance counters during the predetermined period minus S;

program instructions for estimating a cache occupancy of a cache for the given thread based on estimating cache misses that occurred since a previous estimate of a previous occupancy E for the given thread using the self-thread value S and the other-thread value O and estimating a fraction of the previous occupancy E unaffected by the cache misses that occurred since the previous estimate using the previous occupancy E for the given thread, the self-thread value S and the other-thread value O, wherein the cache occupancy indicating an estimated amount of data that is stored in the cache for the given thread; and program instructions for assigning computing environment resources to the given thread based on the estimated cache occupancy.

15. The computer program as recited in claim 14, further including, program instructions for tracking estimated occupancy ratios over a plurality of periods, and program instructions for constructing a cache performance curve based on the tracked occupancy ratios.

16. The computer program as recited in claim 15, further including, program instructions for detecting changes in the cache performance curve that signal a phase change in the thread, the changes being identified by non-monotonic cache performance curve updates, and program instructions for changing a cache update policy as a result of the phase change.

17. The computer program as recited in claim 14, further including, program instructions for tracking a cache miss ratio for the given thread as the number of cache misses for the given thread divided by a number of total cache references by the given thread.

18. The computer program as recited in claim 14, further including, program instructions for tracking a cycles per instruction ratio for the given thread.

19. A system to manage thread performance in a computing environment, comprising:

a computer device having a plurality of processors;

a memory, the memory including a resource allocation program; and a shared last level cache, wherein the program instructions from the resource allocation program when executed by a processor from the plurality of processors cause the processor to, assign a thread performance counter to threads being created in the computing environment, the thread performance counter measuring a number of cache misses for a corresponding thread, calculate a self-thread value S as a change in the thread performance counter of a given thread during a predetermined period, calculate an other-thread value O as a sum of changes in all the thread performance counters during the predetermined period minus S, estimate a cache occupancy of a cache for the given thread based on estimating cache misses that occurred since a previous estimate of a previous occupancy E for the give thread using the self-thread value S and the other thread value O and estimating a fraction of the previous occupancy E unaffected by the cache misses that occurred since the previous estimate using the previous occupancy E for the given thread, the self-thread value S and the other-thread value O, wherein the cache occupancy indicating an estimated amount of data that is stored in the cache for the given thread, and assign computing environment resources to the given thread based on the estimated cache occupancy.

20. The system of claim 19, wherein the assignment of computing environment resources further includes, moving the execution of the given thread to a second processor from the plurality of processors.

21. The system of claim 19, wherein the assignment of computing environment resources further includes, increasing an amount of allocated processor time to the given thread.

22. The system of claim 19, wherein the assignment of computing environment resources further includes, increasing an amount of allocated cache lines C to the given processor.

23. The system of claim 19, wherein the estimation of the cache occupancy for the given thread further includes, normalizing the values of E, O, and S.

* * * * *